(12) United States Patent
Proudler et al.

(10) Patent No.: US 7,467,370 B2
(45) Date of Patent: *Dec. 16, 2008

(54) APPARATUS AND METHOD FOR CREATING A TRUSTED ENVIRONMENT

(75) Inventors: Graeme John Proudler, Bristol (GB); Boris Balacheff, Bristol (GB); David Plaquin, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 539 days.

This patent is subject to a terminal disclaimer.

(21) Appl. No.: 11/090,964

(22) Filed: Mar. 25, 2005

(65) Prior Publication Data

US 2005/0223221 A1    Oct. 6, 2005

(51) Int. Cl.
*G06F 9/44* (2006.01)

(52) U.S. Cl. .............. 717/100; 726/4; 726/10; 713/165; 713/171

(58) Field of Classification Search .......... 717/100; 713/268, 194; 726/4, 10
See application file for complete search history.

(56) References Cited

U.S. PATENT DOCUMENTS

| | | | |
|---|---|---|---|
| 4,799,156 A | 1/1989 | Shavit et al. ............ 705/26 |
| 4,926,476 A | 5/1990 | Covey .................. 713/164 |
| 5,029,206 A | 7/1991 | Marino et al. ........... 713/164 |
| 5,032,979 A | 7/1991 | Hecht et al. ............ 364/200 |
| 5,038,281 A | 8/1991 | Peters .................. 364/200 |
| 5,144,660 A | 9/1992 | Rose ..................... 726/24 |
| 5,359,659 A | 10/1994 | Rosenthal ................ 380/4 |
| 5,361,359 A | 11/1994 | Tajalli et al. ........... 395/700 |
| 5,404,532 A | 4/1995 | Allen et al. ............ 395/700 |
| 5,421,006 A | 5/1995 | Jablon et al. ........... 395/575 |
| 5,440,723 A | 8/1995 | Arnold et al. ........... 395/181 |
| 5,444,850 A | 8/1995 | Chang ................ 395/200.1 |
| 5,473,692 A | 12/1995 | Davis .................... 380/25 |
| 5,504,814 A | 4/1996 | Miyahara ............... 713/164 |
| 5,530,758 A | 6/1996 | Marino et al. ........... 713/150 |
| 5,572,590 A | 11/1996 | Chess ..................... 380/4 |
| 5,619,571 A | 4/1997 | Sandstrom et al. .......... 380/4 |

(Continued)

FOREIGN PATENT DOCUMENTS

CA        2 187 855 A       6/1997

(Continued)

OTHER PUBLICATIONS

U.S. Appl. No. 09/979,902, filed Nov. 27, 2001, Proudler, et al.

(Continued)

*Primary Examiner*—Wei Y Zhen
*Assistant Examiner*—Phillip H Nguyen
(74) *Attorney, Agent, or Firm*—Richard Anthony Lawrence

(57) ABSTRACT

A computer apparatus for creating a trusted environment comprising a trusted device arranged to acquire a first integrity metric to allow determination as to whether the computer apparatus is operating in a trusted manner; a processor arranged to allow execution of a first trust routine and associated first operating environment, and means for restricting the first operating environment access to resources available to the trust routine, wherein the trust routine being arranged to acquire the first integrity metric and a second integrity metric to allow determination as to whether the first operating environment is operating in a trusted manner.

11 Claims, 8 Drawing Sheets

U.S. PATENT DOCUMENTS

| | | | |
|---|---|---|---|
| 5,692,124 A | 11/1997 | Holden et al. | 726/2 |
| 5,694,590 A | 12/1997 | Thuraisingham et al. | 395/600 |
| 5,787,175 A | 7/1998 | Carter | 713/165 |
| 5,809,145 A | 9/1998 | Slik | 380/25 |
| 5,815,665 A | 9/1998 | Teper et al. | 395/200.59 |
| 5,841,869 A | 11/1998 | Merkling et al. | 713/164 |
| 5,844,986 A | 12/1998 | Davis | 380/4 |
| 5,845,068 A | 12/1998 | Winiger | 726/3 |
| 5,867,646 A | 2/1999 | Benson et al. | 395/186 |
| 5,889,989 A | 3/1999 | Robertazzi et al. | 718/105 |
| 5,903,732 A | 5/1999 | Reed et al. | 395/200.59 |
| 5,922,074 A | 7/1999 | Richard et al. | 726/21 |
| 5,933,498 A | 8/1999 | Schneck et al. | 705/504 |
| 5,960,177 A | 9/1999 | Tanno | 395/200.59 |
| 5,987,608 A | 11/1999 | Roskind | 713/200 |
| 5,991,414 A * | 11/1999 | Garay et al. | 713/165 |
| 6,006,332 A | 12/1999 | Rabne et al. | 713/201 |
| 6,012,080 A | 1/2000 | Ozden et al. | 718/102 |
| 6,023,765 A | 2/2000 | Kuhn | 713/200 |
| 6,067,559 A | 5/2000 | Allard et al. | 709/202 |
| 6,078,948 A | 6/2000 | Podgorny et al. | 709/204 |
| 6,081,830 A | 6/2000 | Schindler | 709/204 |
| 6,081,894 A | 6/2000 | Mann | 713/188 |
| 6,100,738 A | 8/2000 | Illegems | 327/165 |
| 6,125,114 A | 9/2000 | Blanc et al. | 370/389 |
| 6,138,239 A | 10/2000 | Veil | 713/200 |
| 6,211,583 B1 | 4/2001 | Humphreys | 307/131 |
| 6,272,631 B1 | 8/2001 | Thomlinson et al. | 713/155 |
| 6,275,848 B1 | 8/2001 | Arnold | 709/206 |
| 6,289,462 B1 * | 9/2001 | McNabb et al. | 726/21 |
| 6,292,900 B1 | 9/2001 | Ngo et al. | 713/201 |
| 6,327,652 B1 * | 12/2001 | England et al. | 713/2 |
| 6,330,670 B1 | 12/2001 | England et al. | 713/2 |
| 6,334,118 B1 | 12/2001 | Benson | 713/167 |
| 6,367,012 B1 | 4/2002 | Atkinson et al. | 713/176 |
| 6,393,412 B1 | 5/2002 | Deep | 705/400 |
| 6,477,702 B1 | 11/2002 | Yellin et al. | 717/126 |
| 6,505,300 B2 | 1/2003 | Chan et al. | 713/164 |
| 6,513,156 B2 | 1/2003 | Bak et al. | 717/151 |
| 6,609,248 B1 | 8/2003 | Srivastava et al. | 717/147 |
| 6,671,716 B1 | 12/2003 | Diedrichsen et al. | 709/203 |
| 6,681,304 B1 | 1/2004 | Vogt et al. | 711/164 |
| 6,701,440 B1 | 3/2004 | Kim et al. | 726/24 |
| 6,732,276 B1 | 5/2004 | Cofler et al. | 713/200 |
| 6,751,680 B2 | 6/2004 | Langerman et al. | 710/3 |
| 6,757,824 B1 | 6/2004 | England | 713/156 |
| 6,757,830 B1 | 6/2004 | Tarbotton et al. | 713/188 |
| 6,775,779 B1 | 8/2004 | England et al. | 713/200 |
| 6,892,307 B1 | 5/2005 | Wood et al. | 726/8 |
| 6,931,545 B1 * | 8/2005 | Ta et al. | 726/10 |
| 6,948,069 B1 | 9/2005 | Teppler | 713/178 |
| 6,965,816 B2 | 11/2005 | Walker | 701/16 |
| 7,013,481 B1 * | 3/2006 | Ellison et al. | 726/4 |
| 7,069,451 B1 * | 6/2006 | Ginter et al. | 705/51 |
| 7,243,236 B1 * | 7/2007 | Sibert | 713/179 |
| 2001/0037450 A1 | 11/2001 | Metlitski et al. | 713/152 |
| 2002/0012432 A1 | 1/2002 | England et al. | 380/231 |
| 2002/0023212 A1 | 2/2002 | Proudler | 713/164 |
| 2002/0042874 A1 | 4/2002 | Arora | 712/229 |
| 2002/0069354 A1 | 6/2002 | Fallon et al. | 713/2 |
| 2002/0184486 A1 | 12/2002 | Kerschenbaum et al. | 713/150 |
| 2002/0184520 A1 | 12/2002 | Bush et al. | 713/200 |
| 2003/0191957 A1 | 10/2003 | Hypponen et al. | 713/200 |
| 2003/0196110 A1 | 10/2003 | Lampson et al. | 713/200 |
| 2004/0045019 A1 | 3/2004 | Bracha et al. | 719/332 |
| 2004/0073617 A1 | 4/2004 | Milliken et al. | 709/206 |
| 2004/0148514 A1 | 7/2004 | Fee et al. | 713/200 |
| 2005/0256799 A1 | 11/2005 | Warsaw et al. | 705/37 |

FOREIGN PATENT DOCUMENTS

| | | |
|---|---|---|
| EP | 0 304 033 A | 2/1989 |
| EP | 0 421 409 A2 | 4/1991 |
| EP | 0 510 244 A1 | 10/1992 |
| EP | 0 580 350 A1 | 1/1994 |
| EP | 0 825 511 A | 2/1998 |
| EP | 0 848 315 A2 | 6/1998 |
| EP | 0 849 657 A | 6/1998 |
| EP | 0 849 680 A2 | 6/1998 |
| EP | 0 465 016 | 12/1998 |
| EP | 0 893 751 A1 | 1/1999 |
| EP | 0 895 148 A | 2/1999 |
| EP | 0 926 605 A1 | 6/1999 |
| EP | 0 992 958 A2 | 4/2000 |
| EP | 1 030 237 A1 | 8/2000 |
| EP | 1 056 014 A1 | 8/2000 |
| EP | 1 049 036 A2 | 11/2000 |
| EP | 1 055 990 A1 | 11/2000 |
| EP | 1 056 010 A1 | 11/2000 |
| EP | 1 076 279 A1 | 2/2001 |
| EP | 1 107 137 A2 | 6/2001 |
| GB | 2 317 476 A | 3/1998 |
| GB | 2 336 918 A | 11/1999 |
| GB | 0020441.2 | 8/2000 |
| GB | 2 353 885 A1 | 3/2001 |
| GB | 2 361 153 A | 10/2001 |
| WO | 93/25024 A | 12/1993 |
| WO | 94/11967 A1 | 5/1994 |
| WO | 95/24696 A | 9/1995 |
| WO | 95/27249 A | 10/1995 |
| WO | 97/29416 A2 | 8/1997 |
| WO | 98/15082 A | 4/1998 |
| WO | 98/26529 | 6/1998 |
| WO | 98/36517 A | 8/1998 |
| WO | 98/40809 A2 | 9/1998 |
| WO | 98/44402 | 10/1998 |
| WO | 98/45778 A | 10/1998 |
| WO | 00/19324 A1 | 4/2000 |
| WO | 00/31644 | 6/2000 |
| WO | 00/48062 | 8/2000 |
| WO | 00/48063 | 8/2000 |
| WO | 00/52900 A1 | 9/2000 |
| WO | 00/54125 | 9/2000 |
| WO | 00/54126 | 9/2000 |
| WO | 00/58859 | 10/2000 |
| WO | 00/73880 A1 | 12/2000 |
| WO | 00/73904 A1 | 12/2000 |
| WO | 00/73913 A1 | 12/2000 |
| WO | 01/09781 A2 | 2/2001 |
| WO | 01/13198 | 2/2001 |
| WO | 01/23980 A1 | 4/2001 |
| WO | 01/27722 A1 | 4/2001 |
| WO | 01/65334 A2 | 9/2001 |
| WO | 01/65366 A1 | 9/2001 |

OTHER PUBLICATIONS

U.S. Appl. No. 09/979,903, filed Nov. 27, 2001, Proudler, et al.
U.S. Appl. No. 10/080,476, filed Feb. 22, 2002, Proudler et al.
U.S. Appl. No. 10/080,477, filed Feb. 15, 2002, Brown et al.
U.S. Appl. No. 10/080,478, filed Feb. 22, 2002, Pearson et al.
U.S. Appl. No. 10/080,479, filed Feb. 22, 2002, Pearson et al.
U.S. Appl. No. 10/194,831, filed Jul. 11, 2002, Chen et al.
U.S. Appl. No. 10/208,718, filed Jul. 29, 2002, Chen et al.
U.S. Appl. No. 10/240,138, filed Sep. 26, 2002, Choo.
EDS Timeline, The 1960's, at EDS.com.
Anderson, R., et al., "Tamper Resistance—a Cautionary Note," *ISENIX Association, Second USENIX Workshop on Electronic Commerce*, pp. 1-11 (Nov. 18-21, 1996).

Barkley, J., et al., "Managing Role/Permission Relationships Using Object Access Types," *ACM*, pp. 73-80, Jul. 1998, retrieved Jun. 25, 2005.

Berger, J.L., et al., "Compartmented Mode Workstation: Prototype Highlights," *IEEE Transactions on Software Engineering*, vol. 16, No. 6 (Jun. 1990).

Bontchev, V., "Possible Virus Attacks Against Integrity Programs and How to Prevent Them," Virus Bulletin Conference, pp. 131-141 (Sep. 1992).

Burke, J.P., "Security Suite Gives Sniffer Programs Hay Fever," *HP Professional*, vol. 8, No. 9, 3 pages total (Sep. 1994).

Chaum, D., "Security without Identification: Transaction Systems to Make Big Brother Obsolete," *Communications of the ACM*, vol. 28, No. 10, pp. 1030-1044 (Oct. 1985).

Choo, T.H., et al., "Trusted Linux: A Secure Platform for Hosting Compartmented Applications," *Enterprise Solutions*, pp. 1-14 (Nov./Dec. 2001).

Dalton, C., et al., "An operating system approach to securing e-services," *Communications of the ACM*, vol. 44, Issue 2 (Feb. 2001).

Dalton, C., et al., "Applying Military Grade Security to the Internet," *Computer Networks and ISND Systems*, vol. 29, pp. 1799-1808 (1997).

Dalton, C.I., et al., "Design of secure UNIX," Elsevier Information Security Report, (Feb. 1992).

Ford, B., et al., "Microkernels Meet Recursive Virtual Machines", Operating Systems Review, ACM, vol. 30, No. Special Issue, pp. 137-151 (Dec. 21, 1996).

Goldberg, R.P., "Survey of Virtual Machine Research", Computer, IEEE Service Center, vol. 7, No. 6, pp. 34-45 (Jun. 1974).

Grimm, R., et al., "Separating Access Control Policy, Enforcement, and Functionality in Extensible Systems," *ACM* pp. 36-70, Feb. 2001, retrieved Jun. 25, 2005.

Hallyn, S.E., et al., "Domain and Type Enforcement for Linux," Internet: <http://www.usenix.org/publications/library/proceedings/als2000/full_papers/hallyn/hallyn_html/>. (Retrieved Apr. 24, 2002).

Jaeger, T., et al., "Requirements of Role-Based Access Control for Collaborative Systems," *ACM*, pp. 53-64, Dec. 1996, retrieved Jun. 25, 2002.

Loscocco, P., et al., "Integrating Flexible Support for Security Policies into the Linux Operating System," Internet: <www.nsa.gov/selinux> (Retrieved Apr. 24, 2002).

Milojicic, D., et al., "Process Migration," Internet: <http://www.hpl.hp.com/techreports/1999/HPL-1999-21.html.> pp. 1-48 (Dec. 5, 1998).

Naor, M., et al., "Secure and Efficient Metering," Internet: <http://citeseer.nj.com/naor98secure.html> Sections 1-1.3 (1998).

P.C Magazine Online; The 1999 Utility Guide: Desktop Antivirus; Norton Antivirus 5.0 DeLux, Internet.

Popek, G. J., "Formal Requirements for Virtualizable Third Generation Architectures", Communications of the Association for Computing Machinery, ACM, vol. 17, No. 7, pp. 412-421 (Jul. 1974).

Radai, Y., "Checksumming Techniques for Anti-Viral Purposes," Virus Bulletin Conference, pp. 39-68 (Sep. 1991).

Schneck, P.B., "Persistent Access Control to Prevent Piracy of Digital Information," *Proceedings of the IEEE*, vol. 87, No. 7, pp. 1239-1250 (Jul. 1999).

Senie, D., "Using the SOCK_PACKET mechanism in Linux to gain complete control of an Ethernet Interface," Internet: <http://www.senie.com/dan/technology/sock_packet.html>.(Retrieved Apr. 24, 2002).

"System for Detecting Undesired Alteration of Software," *IBM Technical Bulletin*, vol. 32, No. 11, pp. 48-50 (Apr. 1990).

Wiseman, S., et al., "The Trusted Path between SMITE and the User," *Proceedings 1988 IEEE Symposium on Security and Privacy*, pp. 147-155 (Apr. 18-21, 1988).

Yee, B., "Using Secure Coprocessors," Doctoral thesis—Carrnegié Mellon University, pp. 1-94 (May 1994).

Zhang, N.X., et al., "Secure Code Distribution," pp. 76-79, 1997 *IEEE*, retrieved Jun. 25, 2005.

*Boot Integrity Services Application Programming Interface*, Version 1.0, Intel Corporation, pp. 1-60 (Dec. 28, 1998).

"Building a Foundation of Trust in the PC," *Trusted Computing Platform Alliance*, pp. 1-7 (Jan. 2000).

"Information technology—Security techniques—Entity authentication; Part 3: Mechanisms using digital signature techniques," *ISO/IEC 9798-3*, Second Edition, pp. 1-6 (1998).

"Information technology—Security techniques—Key management—Part 3: Mechanisms using asymmetric techniques," *ISO/IEC 11770-3*, pp. 1-34 (1999).

"NIST Announces Technical Correction to Secure Hash Standard," Internet: <http://www.nist.gov/public_affairs/releases/hashstan.htm> pp. 1-2 (Oct. 24, 2002).

"Norton AntiVirus 5.0 Delux," *PC Magazine Online; The 1999 Utility Guide: Desktop Antivirus*, pp. 1-2, Internet: <http://www.zdnet.com/pcmag/features/utilties99/deskav07.html> (Retrieved Nov. 30, 2001).

"Secure Computing with JAVA™: Now and the Future," Internet: <http://java.sun.com/marketing/collateral/security.html> pp. 1-29 (Apr. 2, 2002).

"Secure Execution Environments, Internet Safety through Type-Enforcing Firewalls," Internet: <thp://www.ghp.com/research/nailabs/secure-execution/internet-safety.asp> (Retrieved Apr. 24, 2002).

*Sophos Anti-Virus for Notes/Domino Release Notes*, Version 2.0, pp. 1-2, Internet: >http://www.sophos.com/sophos/products/full/readmes/readnote.txt> (Retrieved Nov. 30, 2001).

*Trusted Computing Platform Alliance (TCPA), Main Specification*, Version 1.0, pp. 1-284 (2000).

*Trusted Computing Platform Alliance (TCPA), TCPA Design Philosophies and Concepts*, Version 1.0, Internet: <www.trustedpc.org> pp. 1-30 (Jan. 2001).

The Trusted Computing Platform Alliance, "Building Foundation of Trust in the PC,", 9 pages, located at Internet address <www.trustedpc.org/home/home.html.> (Jan. 2000).

\* cited by examiner

APPARATUS AND METHOD FOR CREATING A TRUSTED ENVIRONMENT

FIELD OF THE INVENTION

The present invention relates to an apparatus and method for creating a trusted environment.

BACKGROUND

Computer platforms used for commercial applications typically operate in an environment where their behaviour is vulnerable to modification by local or remote entities.

Additionally, with the continuing increase in computer power it has become increasingly common for computer platforms to support multiple users, where each user can have their own operating environment installed on the computer platform. Various virtualization technologies have been developed to support this approach, typically allowing each user to have their own virtual machine running on the computer platform.

Where a number of separate operating systems are running simultaneously on a computer platform the operating systems are not necessarily isolated or protected from one another. The volume of source code for the software components involved is typically so large in modern operating systems that it is virtually impossible to ensure the correctness of the source code and whether the behaviour of the source code will behave as expected.

Accordingly, this potential insecurity of the platform is a limitation on its use by parties who might otherwise be willing to use the platform.

Increasing the level of trust in platforms therefore enables greater user confidence that the platform and operating system environment behave in a known manner.

SUMMARY OF THE INVENTION

In accordance with the present invention there is provided a computer apparatus for creating a trusted environment comprising a trusted device arranged to acquire a first integrity metric to allow determination as to whether the computer apparatus is operating in a trusted manner; a processor arranged to allow execution of a first trust routine and associated first operating environment, and means for restricting access of the first operating environment to resources available to the trust routine, wherein the trust routine is arranged to acquire the first integrity metric and a second integrity metric to allow determination as to whether the first operating environment is operating in a trusted manner.

BRIEF DESCRIPTION OF THE DRAWINGS

For a better understanding of the present invention and to understand how the same may be brought into effect reference will now be made, by way of example only, to the accompanying drawings, in which:—

SPECIFIC DESCRIPTION OF EMBODIMENTS OF THE INVENTION

Figure 1:
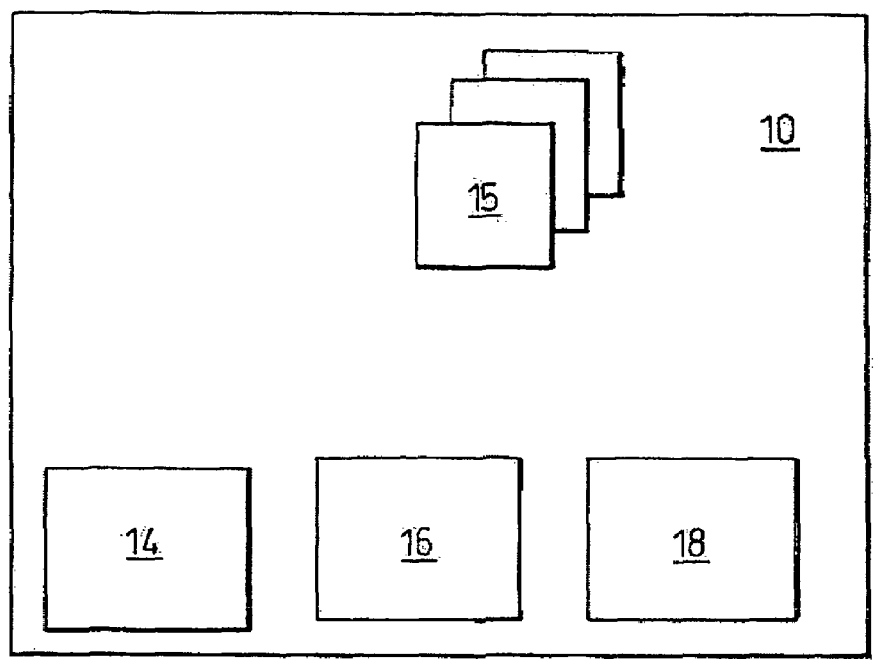
FIG. 1 illustrates a system capable of implementing embodiments of the present invention.

Two sets of embodiments of the invention will now be described, with some common features (particularly in relation to basic platform architecture, trusted devices and collection of integrity metrics) between the two. The first set of embodiments describes a first approach to virtualization employing privilege levels of a processor to achieve isolation. The second set of embodiments describes another approach to virtualization and also indicates a form of virtual trusted device for a virtual operating environment developed to be highly consistent with Trusted Computing Group (TCG) specifications for trusted platforms and trusted devices.

The embodiments generally provide the incorporation into a computing platform of a physical trusted device and a software trust routine (i.e. a virtual trusted device). The function of the physical trusted device is to bind the identity of the platform to reliably measured data that provides an integrity metric of the platform, while the virtual trusted device binds the identity of an associated software operating environment (e.g. an operating system) to reliably measured data that provides an integrity metric of the operating environment. The identities and the integrity metrics may be compared with expected values provided by a trusted party (TP) that is prepared to vouch for the trustworthiness of the platform. Optionally, the expected values provided by the trusted third party are securely stored in the respective physical trusted device and the virtual trusted device. If there is a match, the implication is that at least part of the platform and operating system is operating correctly, depending on the scope of the integrity metric.

A user verifies the correct operation of the platform and operating environment before exchanging other data with the platform. A user does this by requesting the identities and integrity metrics of the physical trusted device and the virtual trusted device. (Optionally the trusted devices will refuse to provide evidence of identity if it itself was unable to verify correct operation of the platform.) The user receives the proof of identity and the identity metric, and compares them against the values provided by the trusted third party. If the measured data reported by the trusted devices are the same as that provided by the trusted third party, the user can trust the platform.

Additionally, where the computer platform is arranged to support a plurality of separate operating environments, each operating environment having their own respective virtual trusted device, the users of the respective operating environments can trust that their operating environment is isolated from any other operating environment running on the computer platform.

Once a user has established trusted operation of the platform and operating environment, he exchanges other data with the platform. For a local user, the exchange might be by interacting with some software application running within the operating environment on the platform. For a remote user, the exchange might involve a secure transaction. In either case, the data exchanged is typically 'signed' by one of the trusted devices. The user can then have greater confidence that data is being exchanged with a platform whose behaviour can be trusted.

The trusted devices use cryptographic processes but do not necessarily provide an external interface to those cryptographic processes.

In first embodiments, to ensure there is a minimum risk that the virtual trusted device is susceptible to software attack by rogue software running on the computer platform the virtual trusted device is arranged to be executed in a processor privilege level that restricts access to other software applications being executed on the computer platform (as described below). Additionally, secrets associated with the virtual trusted device are stored such that the secrets are inaccessible to software applications being executed in a processor privilege level that is lower than that in which the virtual trusted device is executed. Also, a most desirable implementation would be to make the physical trusted device tamperproof, to protect secrets by making them inaccessible to other platform functions and provide an environment that is substantially immune to unauthorised modification. Since tamper-proofing is impossible, the best approximation is a trusted device that is tamper-resistant, or tamper-detecting. The trusted device, therefore, preferably consists of one physical component that is tamper-resistant.

Techniques relevant to tamper-resistance are well known to those skilled in the art of security. These techniques include methods for resisting tampering (such as appropriate encapsulation of the trusted device), methods for detecting tampering (such as detection of out of specification voltages, X-rays, or loss of physical integrity in the trusted device casing), and methods for eliminating data when tampering is detected.

A trusted platform 10 is illustrated in the diagram in FIG. 1. The platform 10 includes the standard features of a keyboard 14, mouse 16 and visual display unit (VDU) 18, which provide the physical 'user interface' of the platform. In the platform 10, there are a plurality of modules 15: these are other functional elements of the trusted platform of essentially any kind appropriate to that platform (the functional significance of such elements is not relevant to the present invention and will not be discussed further herein).

Figure 2:
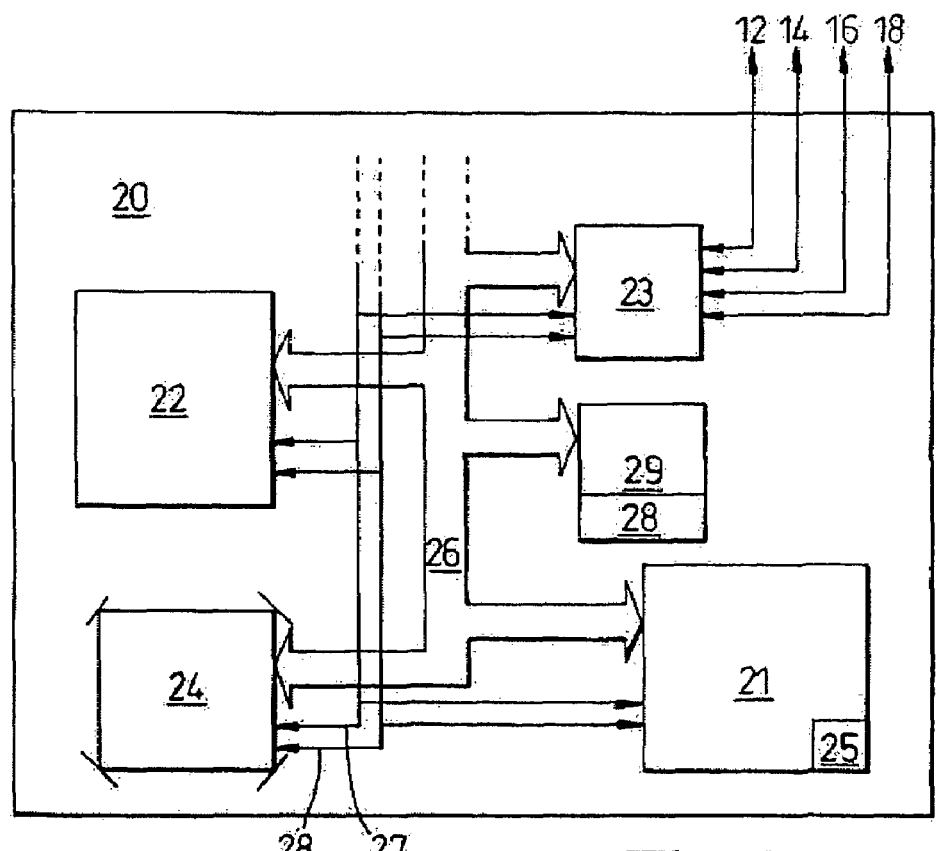
FIG. 2 illustrates a motherboard for a computer platform of FIG. 1 including a trusted device.

As illustrated in FIG. 2, the motherboard 20 of the trusted computing platform 10 includes (among other standard components) a main processor 21 with internal memory 25, main memory 22, a trusted device 24, a data bus 26 and respective control lines 27 and lines 28, BIOS memory 29 containing the BIOS program 28 for the platform 10 and an Input/Output (IO) device 23, which controls interaction between the components of the motherboard, the keyboard 14, the mouse 16 and the VDU 18. The main memory 22 is typically random access memory (RAM).

In the first embodiment the processor 21 has four execution privilege levels PL0, PL1, PL2, PL3. Examples of such processors are the Hewlett-Packard's PA-RISC processor or Intel's IA-64 processor, however other processor configurations having a plurality of privilege levels can also be used.

Figure 3:
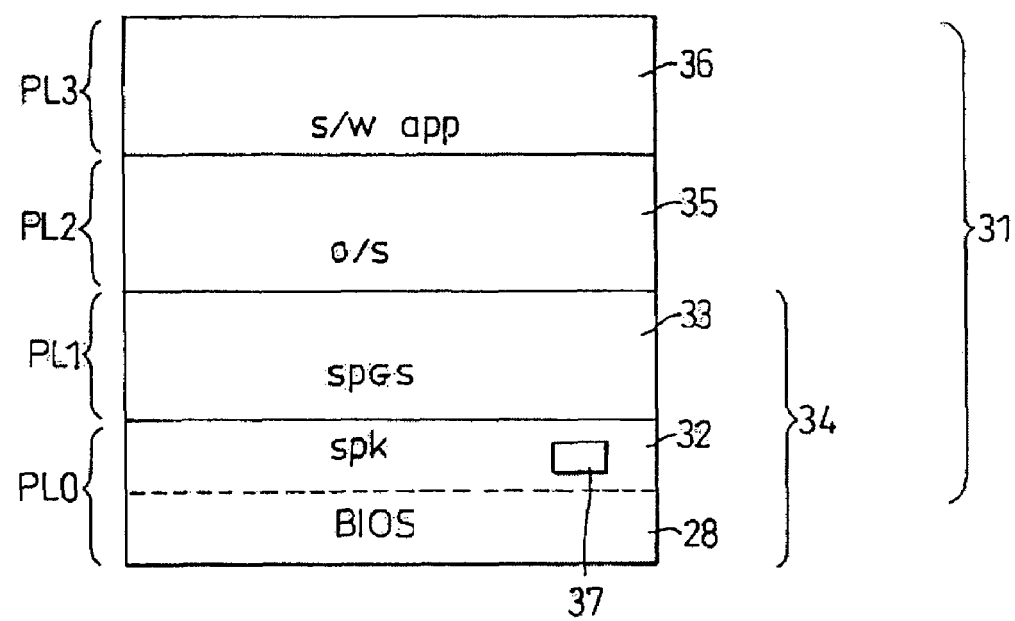
FIG. 3 illustrates privilege levels of a processor useful for first embodiments of the present invention.

Running in the processor 21 of this first embodiment is a secure platform architecture (SPA) 31, as shown in FIG. 3. The SPA 31 includes BIOS program or firmware 28 that runs on the processor 21 at execution privilege level 0 (PL0), the most privileged level of processor 21. SPA 31 includes a four-layer software ring that runs on top of BIOS firmware 28 in processor 21.

The innermost software ring, running on top of BIOS firmware 28, is referred to as the secure platform kernel (SPK) 32 and is the only software ring that runs as a privileged task. SPK 32 runs at PL0 and forms the foundation layer of SPA 31 and is the only ring layer that accesses privileged system registers and executes privileged instructions.

A secure platform global services module (SPGS) 33 runs on top of the SPK 32 as an unprivileged task. SPGS 33 runs at execution privilege level 1 (PL1), the second most privileged level of processor 21. SPK 32 and SPKGS 33 are collectively referred to as secure platform (SP) 34.

At least one operating system image 35 runs on top of SPGS 33 as an unprivileged task. Operating system image 35 runs at execution privilege level 2 (PL2), the third most privileged level of processor 31. End user applications 36 run on top of operating system image(s) 35 as unprivileged tasks. End user applications 36 run at execution privilege level 3 (PL3), the fourth privileged level (i.e., the least privileged level) of processor 21.

SPK 32 is preferably a small kernel of trusted, provably correct code that performs security critical services where the small size contributes to the SPK's security and correctness. Examples of security critical services include memory and process management, trap and interrupt handling, and cryptographic services, where some of these security services may be performed via a virtual trust device, as described below. SPGS 33 is constructed with trusted code, but utilizes hardware security capabilities of the processors 21, such as IA-64 processors, to minimize the impact of a failure. SPGS 33 runs as an unprivileged task and employs SPK 32 to perform privileged operations.

Additionally, the SPK 32 includes code to allow execution of one or more virtual trusted devices 37 within the SPK 32. The virtual trusted device(s) 37 are associated with an operating environment executed in PL2 and PL3 and allow a user to establish whether the associated operating environment can be trusted, as described below. It is not essential, however, for the virtual trust device code to be incorporated within the SPK code, the code can be housed elsewhere, for example in the trusted device 24.

To ensure that the virtual trusted device 37 can be trusted it is desirable for the manufacture of the SPK code to be validated by a trusted third party. On validation a validation credential signed with the trusted third parties private key is associated with the SPK code.

SPGS 33 typically includes all the services that do not have to be included in SPK 32. One reason that secure platform 34 is split into SPK 32 and SPGS 33 is to permit SPK 32 to be small, stable and verifiable.

Interfaces between BIOS firmware 28 and processor hardware 21 include a privileged application binary interface (ABI) and a non-privileged ABI. The interfaces between SPK 32 and BIOS firmware 28 include a privileged ABI, a non-privileged ABI, and processor abstraction layer (PAL)/system abstraction layer (SAL)/extensible firmware interface (EFI) interfaces. The interfaces between SPGS 33 and SPK 32 include a secure platform interface (SPI) and a non-privileged ABI. The interfaces between operating system image(s) 35 and SPGS 33 include a SPI, a global services interface (GSI), and a non-privileged ABI. The interfaces between end user applications 36 and operating system image(s) 35 include an application program interface (API) and a non-privileged ABI.

SPGS 33 can partition operating system image layer 35 into multiple independent protection domains which operate at PL2. A protection domain is herein referred to as a software partition and associated collection of system resources, such as memory, I/O, processors, and the like, created by SPGS 33 for the purpose of loading and executing a single operating system image 35. Each of the multiple independent protection domains are capable of booting and executing an operating system image 35 or any other program capable of operation using only SPK 32 and SPGS 33 services, such as a specialized application control program.

The multiple independent protection domains running at PL2 are protected from each other through the memory protection capabilities of the four privilege level processor hardware 21, such as the memory protection capabilities of the IA-64 processor. Therefore, a failure in one of the independent protection domains typically has no effect on the other independent protection domains, even if the failure is an operating system crash. The independent protection domains provide the capability to manage system utilization on a fine-grain basis while maintaining security. Operating system images 35 are ported to secure platform 34 of SPA 31 similar to how operating systems are ported to a new hardware platform industrial standard archicture ISA in the classical architecture for operating systems.

End user applications 36 run at the least privileged level, PL3, as unprivileged tasks under the control of an operating system image 35 in a secure platform 34 protection domain. Typically, from the end user application perspective, the end user application 36 operates under the control of an operating system image 35 as the end user application would run under the control of an operating system in the classical architecture for operating systems.

In order for the computer platform 10 and operating environment(s) to be trusted, a chain of trust from the system hardware, through the boot process, to final running code is established. In addition, all software code is preferably authenticated before being executed, and a properly authenticated piece of code is preferably unchangeable except by a similarly trusted component to maintain the chain of trust. The software authentication should be more than a simple check sum or other forgeable scheme. Thus, SPA 31 preferably employs strong authentication using cryptographic methods, such as public key encryption, such that software can be undetectably corrupt only if a private key is known.

The chain of trust extends back to the trusted device 24. As described below, after system reset the processor 21 is initially controlled by the trusted device 24, which then after performing a secure boot process hands control over to the BIOS firmware 28. During the secure boot process, the trusted device 24 acquires an integrity metric of the computer platform 10, as described below.

Figure 4:
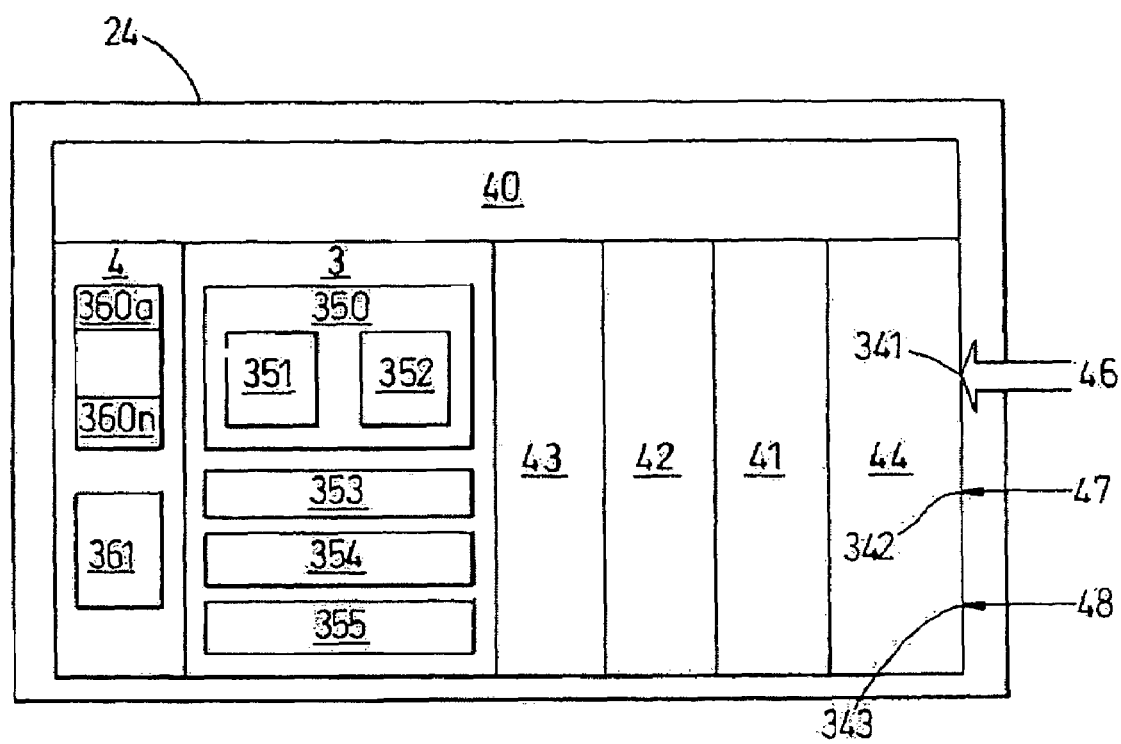
FIG. 4 illustrates the trusted device of FIG. 2 in more detail.

Specifically, the trusted device 24 used for embodiments of the invention comprises, as shown in FIG. 4: a controller 40 programmed to control the overall operation of the trusted device 24, and interact with the other functions on the trusted device 24 and with the other devices on the motherboard 20; a measurement function 41 for acquiring the integrity metric from the platform 10; a cryptographic function 42 for signing, encrypting or decrypting specified data; an authentication function 43; and interface circuitry 44 having appropriate ports (46, 47 & 48) for connecting the trusted device 24 respectively to the data bus 26, control lines 27 and address lines 28 of the motherboard 20. Each of the blocks in the trusted device 24 has access (typically via the controller 40) to appropriate volatile memory areas 4 and/or non-volatile memory areas 3 of the trusted device 24. Additionally, the trusted device 24 is designed, in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail.

One item of data stored in the non-volatile memory 3 of the trusted device 24 is a certificate 350. The certificate 350 contains at least a public key 351 of the trusted device 24 and optionally an authenticated value 352 of the platform integrity metric measured by a trusted party (TP). The certificate 350 is signed by the TP using the TP's private key prior to it being stored in the trusted device 24. In later communications sessions, a user of the platform 10 can verify the integrity of the platform 10 and operating environment by comparing the acquired integrity metric (i.e. measured integrity metric) with an authentic integrity metric 352, as described below. Knowledge of the TP's generally-available public key enables simple verification of the certificate 350. The non-volatile memory 45 also contains an identity (ID) label 353. The ID label 353 is a conventional ID label, for example a serial number, that is unique within some context. The ID label 353 is generally used for indexing and labelling of data relevant to the trusted device 24, but is insufficient in itself to prove the identity of the platform 10 under trusted conditions.

The trusted third party that is requested to supply the authentic integrity metric will inspect the type of the platform to decide whether to vouch for it or not. This will be a matter of policy. If all is well the TP measures the value of integrity metric of the platform. Then, the TP generates a certificate for the platform. The certificate is generated by the TP by appending the trusted device's public key, and optionally its ID label, to the measured integrity metric, and signing the string with the TP's private key.

The trusted device 24 can subsequently prove its identity by using its private key to process some input data received from the user and produce output data, such that the input/output pair is statistically impossible to produce without knowledge of the private key. Hence, knowledge of the private key forms the basis of identity in this case. Clearly, it would be feasible to use symmetric encryption to form the basis of identity. However, the disadvantage of using symmetric encryption is that the user would need to share his secret with the trusted device. Further, as a result of the need to share the secret with the user, while symmetric encryption would in principle be sufficient to prove identity to the user, it would insufficient to prove identity to a third party, who could not be entirely sure the verification originated from the trusted device or the user.

The trusted device 24 is initialised by writing the certificate 350 into the appropriate non-volatile memory locations 3 of the trusted device 24. This is done, preferably, by secure communication with the trusted device 24 after it is installed in the motherboard 20. The method of writing the certificate to the trusted device 24 is analogous to the method used to initialise smart cards by writing private keys thereto. The secure communication is supported by a 'master key', known only to the TP, that is written to the trusted device (or smart card) during manufacture, and used to enable the writing of data to the trusted device 24; writing of data to the trusted device 24 without knowledge of the master key is not possible.

At some later point during operation of the platform, for example when it is switched on or reset the trusted device 24 measures and stores the integrity metric 361 of the platform.

The trusted device 24 is equipped with at least one method of reliably measuring or acquiring the integrity metric of the computing platform 10 with which it is associated to enable comparison with the authentic integrity metric supplied by the trusted third party. In this first embodiment, the integrity metric is acquired by the measurement function 41 by generating a digest of the BIOS instructions in the BIOS memory and the SPK code. The measured integrity metric is signed using the trusted device 24 private key to provide confidence that the integrity metric has been acquired by the trusted device 24. Such an acquired integrity metric, if verified as described above, gives a potential user of the platform 10 a high level of confidence that the platform 10 has not been subverted at a hardware, or BIOS program, level.

The measurement function 41 has access to: non-volatile memory 3 for storing a hash program 354 and a private key 355 of the trusted device 24, and volatile memory 4 for storing acquired integrity metric in the form of a digest 361. In appropriate embodiments, the volatile memory 4 may also be used to store the public keys and associated ID labels 360a-360n of one or more authentic smart cards (not shown) that can be used to gain access to the platform 10.

In one preferred implementation, as well as the digest, the integrity metric includes a Boolean value, which is stored in volatile memory 4 by the measurement function 31, for reasons described below.

A process for acquiring an integrity metric for the computer platform 10 as used in first embodiments of the invention will now be described with reference to FIG. 5.

In step 500, at switch-on, the measurement function 41 monitors the activity of the main processor 21 on the data, control and address lines (26, 27 & 28) to determine whether the trusted device 24 is the first memory accessed. Processor 21 is directed to the trusted device 24, which acts as a memory. In step 505, if the trusted device 24 is the first memory accessed, in step 510, the measurement function 41 writes to volatile memory 3 a Boolean value which indicates that the trusted device 24 was the first memory accessed. Otherwise, in step 515, the measurement function writes a Boolean value which indicates that the trusted device 24 was not the first memory accessed.

In the event the trusted device 24 is not the first accessed, there is of course a chance that the trusted device 24 will not be accessed at all. This would be the case, for example, if the main processor 21 were manipulated to run the BIOS program first. Under these circumstances, the platform would operate, but would be unable to verify its integrity on demand, since the integrity metric would not be available. Further, if the trusted device 24 were accessed after the BIOS program had been accessed, the Boolean value would clearly indicate lack of integrity of the platform.

However, if a user is prepared to trust the BIOS the computer platform 10 can be arranged to use the BIOS instructions as the first instructions accessed.

In step 520, when (or if) accessed as a memory by the main processor 21, the main processor 21 reads the stored native hash instructions 354 from the measurement function 41 in step 525. The hash instructions 354 are passed for processing by the main processor 21 over the data bus 26. In step 530, main processor 21 executes the hash instructions 354 and uses them, in step 535, to compute a digest of the BIOS memory 29, by reading the contents of the BIOS memory 29 and processing those contents according to the hash program. In step 540, the main processor 21 writes the computed digest 361 to the appropriate non-volatile memory location 4 in the trusted device 24. In a similar manner the measurement function 41 initiates the calculation of a digest for the SPK 32 that is correspondingly stored in an appropriate non-volatile memory location 4 in the trusted device 24. The measurement function 41, in step 545, then calls the BIOS firmware 28 in the BIOS memory 29, and execution continues, as described below.

Clearly, there are a number of different ways in which the integrity metric of the platform may be calculated, depending upon the scope of the trust required. The measurement of the BIOS program's integrity provides a fundamental check on the integrity of a platform's underlying processing environment. The integrity metric should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Other integrity checks could involve establishing that various other devices, components or apparatus attached to the platform are present and in correct working order. In one example, the BIOS programs associated with a SCSI controller could be verified to ensure communications with peripheral equipment could be trusted. In another example, the integrity of other devices, for example memory devices or co-processors, on the platform could be verified by enacting fixed challenge/response interactions to ensure consistent results. Where the trusted device 24 is a separable component, some such form of interaction is desirable to provide an appropriate logical binding between the trusted device 24 and the platform. Also, although in the present embodiment the trusted device 24 utilises the data bus as its main means of communication with other parts of the platform, it would be feasible, although not so convenient, to provide alternative communications paths, such as hard-wired paths or optical paths. Further, although in the present embodiment the trusted device 24 instructs the main processor 21 to calculate the integrity metric in other embodiments, the trusted device itself is arranged to measure one or more integrity metrics.

Preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked.

Optionally, after receiving the computed BIOS digest, the trusted device 24 may inspect the proper value of the BIOS digest in the certificate and not pass control to the BIOS if the computed digest does not match the proper value. Additionally, or alternatively, the trusted device 24 may inspect the Boolean value and not pass control back to the BIOS if the trusted device 24 was not the first memory accessed. In either of these cases, an appropriate exception handling routine may be invoked.

Further details of the operation of first embodiments of the invention will now be described with reference to FIGS. 6 to 8.

Figure 6:
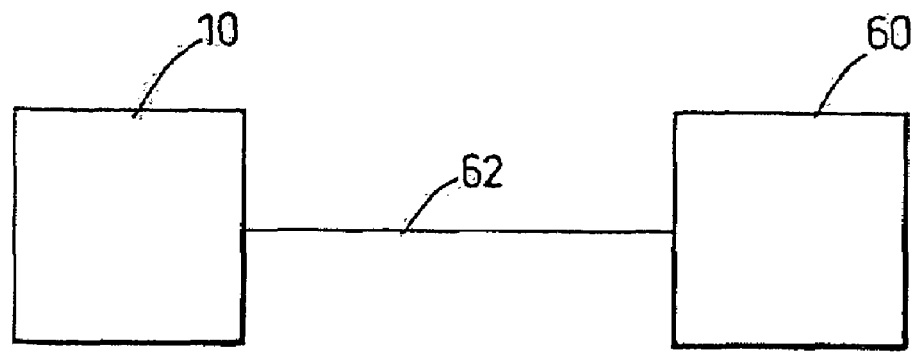
FIG. 6 illustrates a system capable of implementing first embodiments of the present invention.

Optionally, as shown in FIG. 6, to provide control and support to the computer platform 10 a system management counsel (SMC) 60 is coupled to computer platform 10 via connection 62. In one embodiment, SMC 60 includes separate independent processors (not shown), such as standard non-networked personal computers (PCs). Connection 62 can include serial interfaces (e.g., RS-232 and USB), and/or private LAN connections. SMC 60 is primarily employed to authenticate SPK 32 during computer platform 10 initialization. In addition, computer platform 10 is configured via SMC 60. In one embodiment, SMC 60 performs remote debugging for SPK 32 and SPGS 33.

In one embodiment, GUI interfaces for system control and management are only implemented on SMCs 60. This embodiment permits development and testing of system management interfaces and human factors in parallel with development of the rest of computer platform 10, without having to wait for the entire computer platform 10 to be brought up.

More than one SMC 60 can be coupled to computer platform 10 via serial interface and/or LAN connection 62. In one embodiment, SMC 60 functions are integrated into SPGS 33 in a computer platform 10 having a single processor, such as a workstation.

Additionally, the trust device 24 could be located in the SMC and act as the trusted device remotely to the computer platform 10.

Once the trusted device 24 has initiated a trusted boot-up sequence, as described above, it is still necessary to ensure the chain of trust is maintained through to the initialisation of the operating domains. Therefore, in addition to utilising the trusted device 24 to provide information as to whether the computer platform can be trusted it is necessary to determine that a users operating environment can be trusted.

Accordingly, once the trusted device 24 has passed control to the BIOS firmware 28 the SPA 31 is arranged to provide a trusted operating environment as described below.

Initially on passing control to the BIOS firmware 28 the BIOS firmware 28, inter alia, boots up and authenticates the EFI.

An EFI file system stores a secure platform (SP) loader, a system configuration database (SCD), a SPK image 32, and a SPGS image 33.

The EFI loads SP loader from EFI file system into memory 25. The EFI authenticates this image using the processor 21 manufacturer's public key. This authentication requires that SP loader be digitally signed with the processor 21 manufacturer's private key.

The EFI then transfers control to SP loader stored in memory 25. SP loader is an EFI-based secondary loader which is secure platform specific. SP loader is responsible for loading SP images into memory 25.

In one embodiment, it is possible for execution to be transferred to an EFI shell prompt to enable initial system installation and other administrative details, which breaks the SP chain of trust. In this case, the EFI recognizes that trust was lost and does not precede with loading SP loader. Instead, computer platform 10 resets so that all processors 21 will again start fetching instructions from trusted device 24.

SP loader running from memory 25 loads the SCD from EFI file system into memory 25. SP loader then authenticates SCD employing a public key contained in the SP loader image. SP loader employs SCD to determine which SPK 32 and SPGS 33 images to load from EFI file system into memory. SP loader employs the above public key for authenticating the SPK 32 and SPGS 33 images. SP loader creates a virtual mapping for an entry area of SPK 32 with read and execute only permissions. SP loader then switches to virtual mode and branches to the SPK 32 entry point.

In the boot sequence for bringing up SPK 32, SPK 32 running from memory 25 on processor 21, initialises privilege state (e.g., interruption vector table (NT), control registers, and some interrupt configuration) and creates any other additional memory mappings required for SPK 32, such as writeable areas for SPK data. SPK 32 then creates any required memory mappings and any additional set up required to run SPGS 33.

A secure platform (SP) 34 mirrored file system stores two redundant control block images. SPK 32 reads the two redundant control block images from SP mirrored file system into SPK 32 in memory 25 as redundant control block images. The two redundant control block images contain control information initialized at the very first computer platform 10. The redundant control block images are employed to test whether computer platform 10 has already been initialized.

In one embodiment, the redundant control block images each contain at least three distinct control areas. First control area contains an image that also is signed by the processor 21 manufacturer's public key, which was written when computer platform 10 booted for the first time. First control area is employed to store a root system key (RSK) in second control area. Second control area contains the RSK encrypted under itself. Second control area is employed to validate that a correct RSK has been supplied on subsequent boots. Encrypting the RSK under itself permits validation of the RSK, by comparing the results with the value already stored in second control area. Third control area contains a top-level directory of platform control information, including keys, pseudo random number generator (PRNG) state, and last entropy pool snapshot, all encrypted and integrity checked by the RSK.

SPK 32 typically has minimal or no I/O capability. In one embodiment the SP loader performs I/O accesses prior to transfer of control to SPK 32. In another embodiment, SPGS 33 is brought up to an I/O ready state prior to the I/O operation to read from the disk, and returns control to SPK 32. In another embodiment, SPGS 33 loads memory 25 and then a call is made to SPK 32 which performs the above operation.

SPK 32 determines whether the control areas of the two redundant control block images agree and the digital signature checks. If the control areas disagree, the control areas of the redundant control block image whose integrity checks as valid are used, and the control areas of the other redundant control block whose integrity checks as invalid are restored to match the used control areas of the valid redundant control block image. If the control areas of both redundant control block images are damaged, logs are used to recover, similar to many database systems, and to restore the control areas of both redundant control block images. Once the RSK is obtained, the boot process continues.

SPK 32 reads and decrypts protection keys from the SP mirrored file system.

The initial SPGS 33 domain initializes and performs discovery of I/O to include access to SMC 60. The initial SPGS 33 domain loads an encrypted SCD from the SP mirrored file system. The initial SPGS 33 domain requests SPK 32 to decrypt the encrypted SCD. The decrypted SCD specifies the number of SPGS 33 domains to create and which system resources belong to which SPGS 33 domain. The initial SPGS 33 domain then creates each additional SPGS 33 domain specifying the corresponding subset of system resources to include in the processor 21 in which the SPGS 33 domain is run on.

Each SPGS 33 domain similarly reads the decrypted SCD and creates the specified domains. Each SPGS created domain includes the following. System resources are allocated to each SPGS 33 domain on a per domain basis. A domain initial image (DII) is loaded from EFI file system into memory 25 as DII. DII is typically an operating system specific loader for initiating the loading of an operating system for a specific domain in PL2. If SCD indicates that the given SPGS 33 domain is a secure domain, the self-contained public key of SP loader is employed to authenticate DII. Thus, DIIs which are to run in secure SPGS 33 domains are preferably digitally signed with the SP loader's private key. One use of a non-secure SPGS 33 domain is to allow development and debugging of DIIs.

On creation of each of the specified domains an associated virtual trusted device is created in the SPK 32.

As the virtual trusted devices 37 are executed in the SPK 32, which runs at the PL0 level the only level that executes privileged instructions, the virtual trusted devices 37 can effectively be isolated from software executed in the other processor privilege levels. Accordingly, as the SPK 32 is trusted code a user can be confident that the virtual trusted devices are shielded from non-trusted software.

Figure 7:
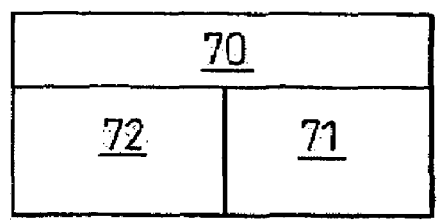
FIG. 7 illustrates a virtual trusted device in accordance with first embodiments of the present invention.

Each virtual trusted device 37 comprises, as shown in FIG. 7, a central routine 70 for controlling the overall operation of the virtual trusted device; a measurement function 71 for acquiring an integrity metric for an associated operating environment and obtaining the integrity metric acquired by the trusted device 24 and makes measurements on software that is to be executed in the associated operating environment; a cryptographic function 72 for signing, encrypting or decrypting specified data. Additionally, each virtual trusted device 37 is able to verify the integrity metric acquired by the trusted device 24 using the trusted third parties public key. The virtual trusted devices 37 have access to memory associated with the PL0 level. Additionally, each virtual trusted device 37 is arranged to be isolated from any other virtual trusted device 37 that is associated with a separate operating environment.

On creation of an associated operating environment in PL1 the associated virtual trusted device 37 in PL0 is issued with a certificate that is associated with the user of the operating environment.

Each virtual trusted devices 37 certificate is stored in local memory in the PL0 level. The certificate contains a public key of the respective virtual trusted device 37 and, optionally, an authenticated value of an integrity metric for measured by a trusted third party to allow verification of the integrity metric acquired by the trusted device 24. The certificate is signed by the trusted third party, using the trusted third parties private key, prior to the certificate being stored in the virtual trusted device 37, thereby confirming that the trusted third party vouches for the virtual trusted device 37. In this embodiment possible trusted third parties could be either the physical trusted device 24 or the SMC 60.

As described below, a user, on accessing a virtual trusted device 37 associated with the respective operating environment, can obtain the computer platform integrity metric acquired and signed by the trusted device 24 with the trusted device's 24 private key and the integrity metric measured and signed by the virtual trusted device 37 and the virtual trusted device's 37 private key for the respective operating environment. Accordingly, the user is able to obtain all the integrity metric information required to allow verification that the respective operating environment can be trusted from the virtual trusted device 37 without the user needing to access the trusted device 24 directly.

As virtual trusted devices 37 are created and destroyed on the creation and destruction of operating environments it is necessary to ensure that their transitory existence does not compromise the trustworthiness of either the computer platform 10 or associated operating environments. As such, to ensure that trust can be maintained it is essential that secrets associated with the virtual trusted device(s) 37 do not exist in more than one active trusted device at any given time. This requires that strict and reliable methods in the computer platform 10 ensure that on the creation and destruction of a virtual trusted device 37 only one copy of relevant secrets (e.g. for example private keys) are maintained.

As such, destruction of a virtual trusted device 37 requires the permanent, safe, secret destruction of the virtual trusted devices secrets. If a virtual trusted device 37 is to be stored for re-use at a later date it secrets must be safely and secretly preserved for future use.

The secrets belonging to the virtual trusted device 37 could be stored in the physical trusted device 24 or SMC 60 using the protected storage facilities of a trusted platform module, for example. Virtual trusted device 37 secrets can be safely stored using the trusted computer platform association (TPCA) maintenance process.

For operating environments that need to continue to exist despite the computer platform 10 having to be power down and back up again it is possible to reassemble the stored associated virtual trusted device 37. This allows the same virtual trusted device 37 to be maintained for the same operating environment, despite the temporary closing down of the operating environment.

However, the method required to reassemble a virtual trusted device 37 depends on the method used to dismantle the initial virtual trusted device 37.

If a virtual trusted device 37 has been saved using the TCPA maintenance process, as described in section 7.3 of the TCPA specification, a new virtual trusted device 37 and trusted platform (i.e. operating environment) must be created (e.g. new endorsement key, credentials can be provided via the virtual trusted devices certificate). The TCPA maintenance process is used to transfer the appropriate secrets of the virtual trusted device to the new virtual trusted device 37 in the new operating environment. This is a two-step process, requiring first that the owner/user of the new operating environment check that the new virtual trusted device 37 and operating environment have at least the same level of security as the original virtual trusted device 37 and operating environment, such that the existing credentials do not overstate the security properties of the new virtual trusted device 37 and associated operating environment.

If the previous virtual trusted device 37 has been saved in full, a blank virtual trusted device 37 and associated operating environment are created in PL0 and PL1 respectively and the original secrets stored from the original virtual trusted device 37 are loaded into the new virtual trusted device. As above, the new operating environment must be checked that the new virtual trusted device 37 and operating environment have at least the same level of security as the original virtual trusted device 37 and associated operating environment, such that the existing credentials do not overstate the security properties of the new virtual trusted device 37 and operating environment. If a SMC 60 holds the secrets, some separate security service is required to confidentially communicate the secrets from the SMC 60 to the computer platform 10. This will require a key distribution service, as is well known to a person skilled in the art.

This allow multiple operating environments to be created, where each operating environment has its own associated virtual trusted device 37 such that each virtual trusted device 37 derives the integrity metric for the computer platform 10 from the trusted device 24 and additionally measures an integrity metric for the associated operating environment. This allows a computer platform 10 to have multiple users, each with their own respective operating environment, where each operating environment is isolated from each other and each operating environment can provide an integrity metric for both itself and the computer platform 10. This allows a user of an operating environment to determine whether his respective operating environment can be trusted without requiring any information as to whether any other operating environment is running on the computer platform 10.

Additionally, as each domain is isolated and the virtual trusted devices 37 are executed in a privileged processor level PL0 rouge software executed in one domain can not attack software executed in another domain.

Figure 8:
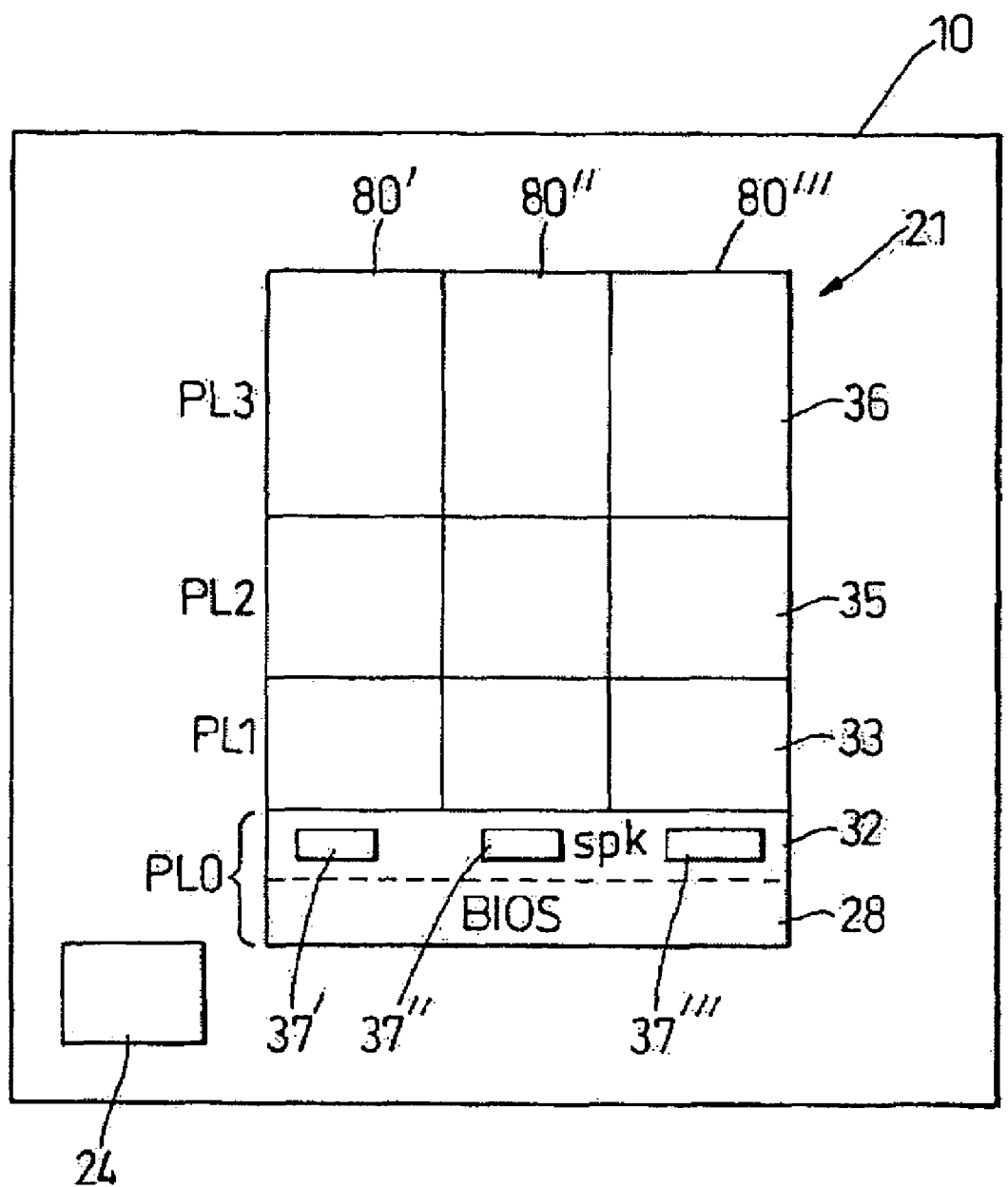
FIG. 8 illustrates first embodiments of the present invention.

FIG. 8 illustrates a computer platform 10 having a trusted device 24 with BIOS and SPK code installed on processor 21. The computer platform 10 is acting as a server having three operating environments 80', 80'', 80''' executed in privilege level 1 where each user would typically communicate with the operating environment 80', 80'', 80''' via a network connection. Each of the operating environments 80', 80'', 80''' has their own respective virtual trusted device 37', 37'', 37''' executed in the SPK 32 at privilege level PL0. Each virtual trusted device 37'. 37'', 37''' has their own unique certificate (not shown) for their respective operating environment. When a user for each operating environment 80', 80'', 80''' wishes to communicate with their respective operating environment 80', 80'', 80''' they create a nonce (not shown), such as a random number, and, issue a challenge to their respective virtual trusted device 37', 37'', 37'''. The nonce is used to protect the user from deception caused by replay of old but genuine signatures (called a 'replay attack') by untrustworthy platforms. The process of providing a nonce and verifying the response is an example of the well-known 'challenge/response' process.

The respective virtual trusted device 37', 37'', 37''' receives the challenge and creates an appropriate response. This may be a digest of the measured integrity metric of the computer platform integrity metric received from the trusted device 24 and signed with the trusted device's 24 private key and the measured integrity metric for the respective operating environment 80', 80'', 80''' signed with the respective virtual trusted device's 37 private key and the nonce, and optionally its ID label. The respective trusted device 37', 37'', 37''' return the signed integrity metric, accompanied by the respective virtual trusted devices 37', 37'', 37''' certificate and the trusted device's 24 certificate 350, to the user.

The user receives the challenge response and verifies the certificate using the well known public key of the TP(s). The user then extracts the virtual trusted device's 37', 37'', 37''' public key and the trusted device's 24 public key from the certificate and uses them to decrypt the signed integrity metrics from the challenge response. Then the user verifies the nonce inside the challenge response. Next the user compares the computed integrity metrics, which it extracts from the challenge response, with the proper platform integrity metrics, which in this embodiment are extracted from the certificates. If any of the foregoing verification steps fails the whole process ends with no further communications taking place.

Assuming all is well the user and the trusted platform use other protocols to set up secure communications for other data, where the data from the platform is preferably signed by the trusted device 37', 37'', 37''' without any knowledge of the other two operating environments installed on the computer platform 10.

A second set of embodiments will now be described with reference to FIGS. 9 to 11. These second embodiments have many features in common with the first embodiments: differences are indicated positively; some common features are indicated positively, and the skilled person will appreciate how other features of the first embodiments may be applied in the second embodiments.

The second set of embodiments use a different form of virtualization technology. Alternative virtualization technologies will now be described. As the skilled person will appreciate, although only specific examples are provided, the principles of the present invention may be applied across the full range of virtualization technologies.

The basic requirement for virtualization is that any machine instruction that is either privileged or sensitive (including input and output) can be intercepted by a control layer (the virtualization layer). Instructions might be ones that would allow direct access to the real hardware or reveal sensitive state about other software running on it.

This virtualization layer can be achieved in different ways. Some processors (as has been described for the first embodiments) are naturally virtualizable, meaning that all privileged or sensitive instructions on that processor (generally a CPU) can be intercepted. Some CPUs (for example those according to the Intel IA-32 architecture) are not naturally virtualizable.

Most forms of CPU and 10 (input/output) device virtualization make use of the hardware protection facilities (such as privilege levels) provided by the real CPU that is being virtualized. On naturally virtualizable platforms that usually just means relying on the CPU protection mechanisms to make sure that the underlying virtualization layer always remains in control of the real hardware. This is all as has been described for the first embodiments above.

On CPUs which are not naturally a more software based approach needs to be taken. It may also be desirable to take such an approach on naturally virtualizable CPUs for performance reasons. This approach involves rewriting the operating systems running on top of the control layer so that they do not contain any privileged or sensitive instructions that would not naturally cause a transition to the control layer. "Paravirtualization" is the term used to describe such source code rewrites of the operating systems. The Xen virtual machine monitor relies on this approach. VMWare uses dynamic binary modification of the running operating systems as its means of remaining in control of the real hardware platform.

In a composite approach, both Intel (Vanderpool) and AMD (Pacifica) have developed hardware features in CPUs to support the running of virtual machine monitors. With this support any instruction, regardless of privilege level, can be made to trigger a transition to the control layer. With this approach it is no longer necessary to rely on running operating systems at different privilege levels to those on which they would normally run.

Figure 9:
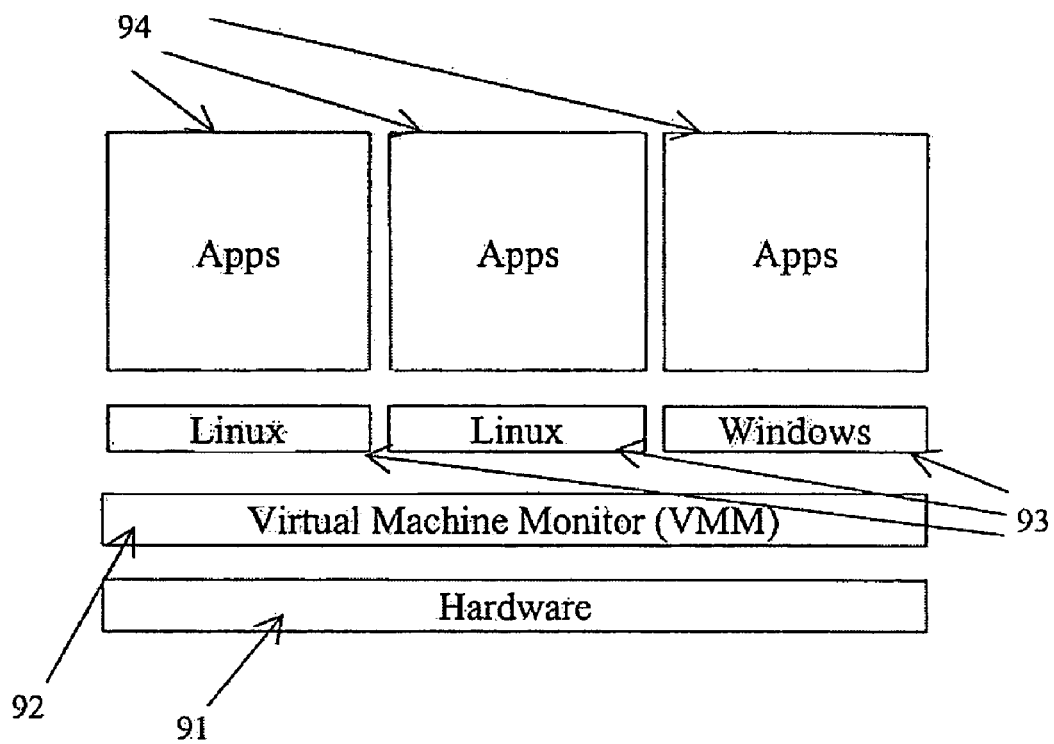
FIG. 9 illustrates, generally, virtualization processes operating on computing apparatus.
Figure 10:
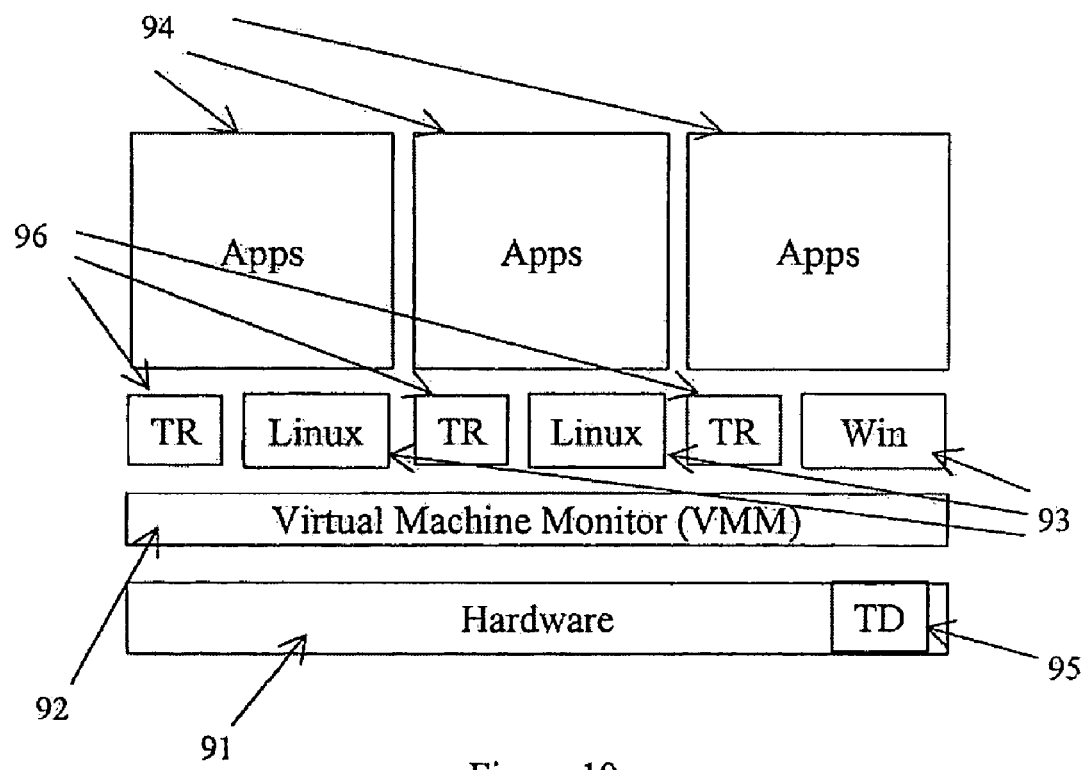
FIG. 10 illustrates the computer apparatus of FIG. 10 modified according to second embodiments of the invention.

A general depiction of a platform using virtualization is provided in FIG. 9. Hardware 91 supports a virtual machine monitor (VMM) 92—this is the virtualization layer which controls virtualization. On top of this are separate virtual machines with their own operating systems 93 and applications 94.

Second embodiments of the invention will be described with reference to this depiction. The trusted device 24 is at the hardware level, and the isolation of a trusted module—and any other virtual component—is achieved by the virtualization layer 92. The result is shown in FIG. 10: the hardware layer 91 contains a trusted device 95, and trust routines 96 sit over the virtualization layer along with the associated operating environments. The second embodiments described below do not rely on the virtualization technology used.

For these second embodiments, the computer system of FIG. 1, the motherboard of FIG. 2 and the trusted device of FIG. 4 are all used essentially as described above, modified to be independent of the virtualization technology—further discussion on elements and use of a trusted device in accordance with TCG practice are however discussed below. Processor 21 in FIG. 2 may therefore be any processor suitable for use with a virtualization technology, rather than specifically one with multiple privilege levels as specifically described above and as described in FIG. 3. Integrity metrics are obtained in the general manner indicated in FIG. 5—the measurement process for such metrics is not reliant on the form virtualization technology as described (although relevant aspects of the virtualization technology may be measured by integrity metrics, as is described below). The measurement of integrity metrics in accordance with TCG practice is described more fully in, for example, "Trusted Computing Platforms—TCPA Technology in Context", edited by Siani Pearson, 2003, Prentice Hall PTR—integrity metrics as described in Pearson may be used in second embodiments of the invention.

The description of FIG. 4 above describes the trusted device—and similarly trusted routines—each as a single entity. The approach taken in TCG specifications is to consider—rather than a single trusted device—multiple entities. The measurement engine which makes the first measurement within the trusted platform is termed the Root of Trust for Measurement (RTM)—this, in addition to the TPM, serves as a root of trust, generally achieved by a trusted source of such software vouching for it. A Core Root of Trust for Measurement (CRTM) comprises executable instructions that, when controlling the main processing engine on the platform, cause the platform to perform the functions of an RTM. The Trusted Platform Module (TPM) is an engine that that stores and reports measurements loaded into it by the RTM and subsequent measurement agents. The Trusted Building Block (TBB) comprises the CRTM and the connections between the CRTM, the TPM and the platform (including the platform's main processing engine). The Trusted Platform Module is, for the physical platform, comprised in a physical device. Second embodiments of the present invention describe how trust routines providing these elements in a virtualized form with respect to the relationships between a trust routine and the operating environment to which it relates can be related to the trusted elements of the physical platform itself.

Figure 5:
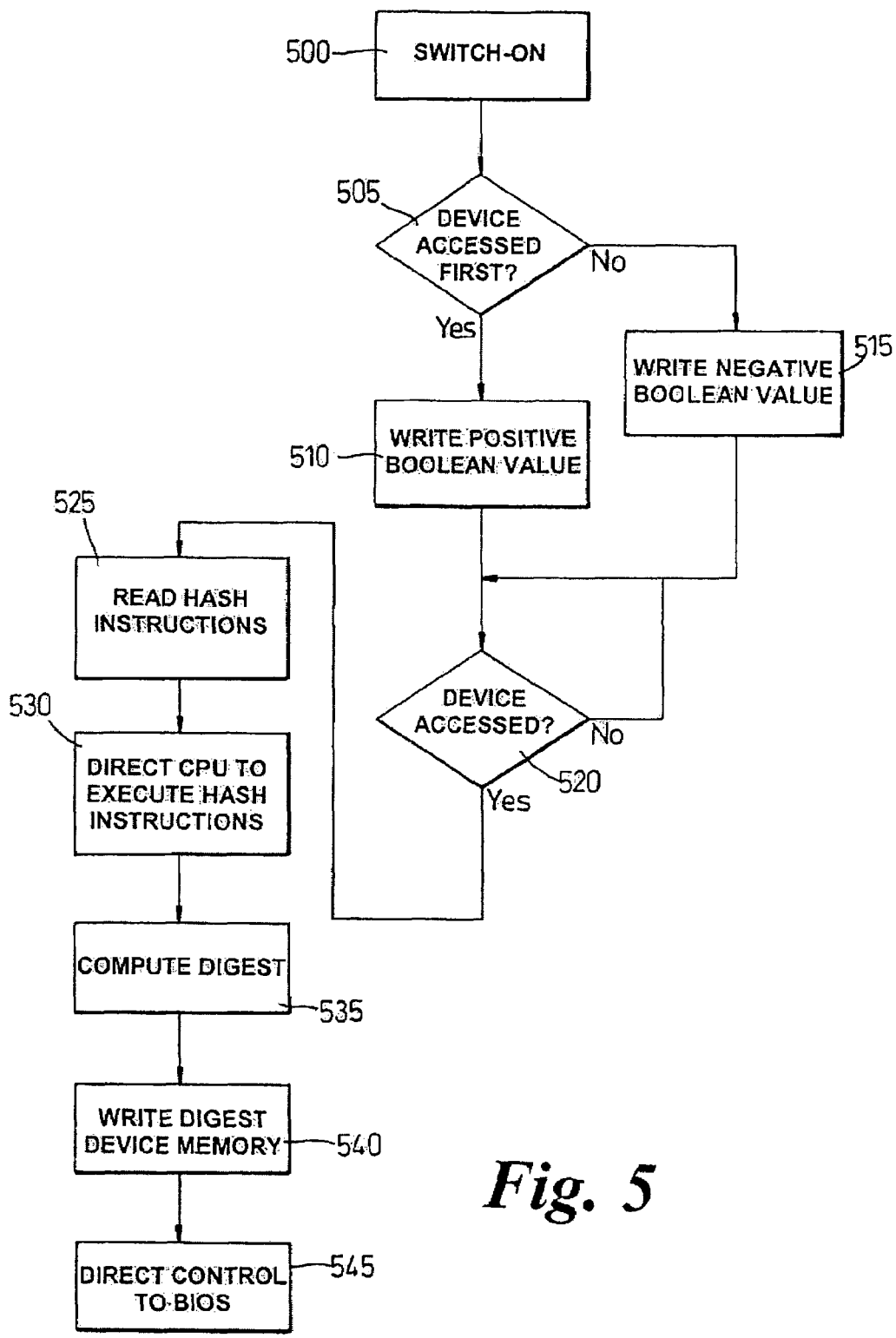
FIG. 5 illustrates the steps involved in acquiring an integrity metric of the computing apparatus as used in embodiments of the invention.

FIG. 5 indicates a process for obtaining an integrity metric of a trusted platform. In the second embodiments, integrity metrics are obtained in essentially this way, but may more specifically be produced the same way as a TCG RTM and TPM acquire an integrity metric. Similarly, supply of an integrity metric may be achieved in the same way that a TCG TPM supplies an integrity metric. One such metric is a measurement of a trust routine—such an integrity metric includes the RTM, CRTM, TPM and TBB for the trust routine, each providing a virtualized equivalent to these elements of TCG trusted platforms. Measurement and provision of integrity metrics according to TCG teaching, together with further description of these entities in TCG implementations, may be found in Pearson as referenced above. This applies equally to trust routines—in second embodiments, a trust routine acquires and supplies an integrity metric of the operating environment in the same way that a TCG RTM and TPM acquire and supply an integrity metric.

It should be appreciated that the trusted device and trust routines can have normal TCG Attestation Identities. An Attestation Identity, as described in Pearson, is a statistically unique, difficult to forge or counterfeit, identity which is verifiable to either a local or a remote entity. It comprises a digital certificate as a public part which contains a label and a public key all signed by a trusted entity and a private key retained as a secret in the TPM. Such an identity provides sufficient evidence that a trusted platform contains the capabilities and data that must be trustworthy if reports about the software environment in that platform are to be trusted. For the physically embodied TPM, such identities (there may be any number) are generated by the TPM and attested by a trusted entity termed a Privacy-CA. The Privacy-CA attests to the Attestation Identity by creating a certificate (termed an AIK Certificate) as described—this binds the identity key to the identity label and generic information about the platform. The Privacy-CA is persuaded to provide such attestation by being provided with sufficient information to establish that the trusted platform containing the TPM is a genuine trusted platform. In TCG specifications, this is provided by a Trusted Platform Module Entity vouching that a TPM is genuine by installing an endorsement key pair in the TPM and embedding the public key of the pair in an endorsement credential; and by a platform manufacturer using a Platform Entity to provide an analogous Platform Certificate to prove that the platform is a genuine trusted platform. In embodiments, there may also be required a Conformance Credential provided by the manufacturer to show that the design of TPM and the design of the platform meet TCG specifications. For the purpose of discussion of these second embodiments, it will be assumed that the trusted device has a conventional TCG Attestation Identity—discussion which follows relates to mechanisms which enable trust routines to obtain Attestation Identities of this type.

The following features are provided by second embodiments of the invention:

The server per se is measured via the physical platform's RTM and store the result in its physical TPM.

The server makes measurements of each virtual trusted platform, including at least:

The virtual TPM (a digest of the executable instructions that customise an engine that instantiates the virtual TPM). This includes the public Endorsement Key [pubEK] of that virtual TPM.

The virtual TBB (a digest of the executable instructions that customise an engine that instantiates the virtual TBB, which includes the virtual RTM).

The virtual normal platform.

A virtual trusted platform is measured via its virtual RTM and stores the results in its virtual TPM.

In order for a virtual TPM to obtain an Attestation Identity, the server's physical TPM must have previously used an Attestation Identity of its own to sign a virtual Endorsement Credential, which comprises:

measurements from the server, including measurements of the virtualisation layer.

measurements of the virtual TPM in the virtual trusted platform sign a virtual Platform Credential, which comprises:

measurements from the server, including measurements of the virtualisation layer.

measurements of the virtual TBB in the virtual trusted platform

When a virtual trusted platform reports its measurements, the virtual trusted platform's virtual TPM uses the virtual platform's Attestation Identity to sign the measurements.

Figure 11:
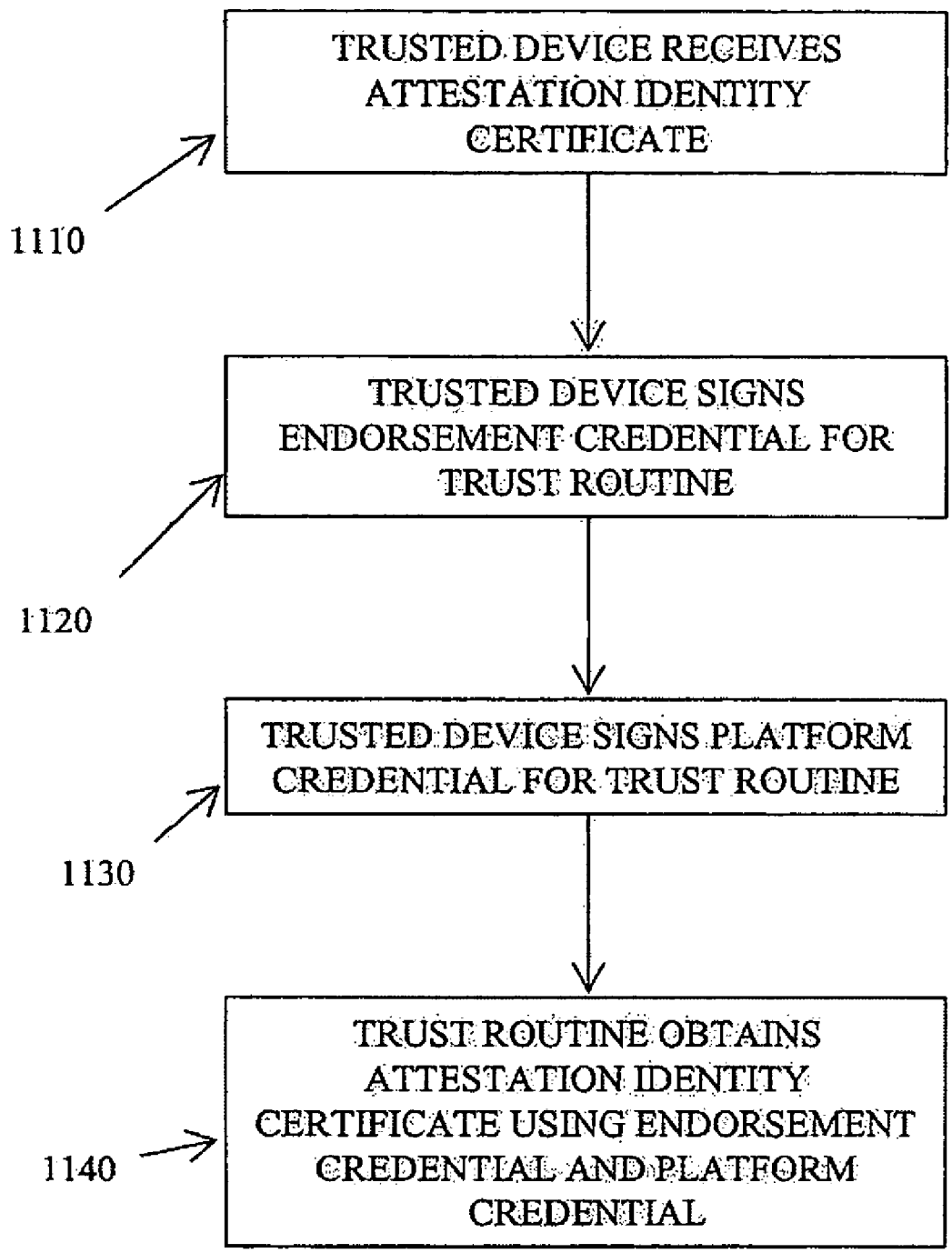
FIG. 11 illustrates a process of providing a trust routine with an attestation identity according to second embodiments of the invention.

When a virtual trusted platform is stopped, the virtual TPM credentials are secured using the physical platform's TPM and binding to the integrity measurements of the virtual trusted platform's TBB The steps involved in enabling a virtual trusted platform to acquire an Attestation Identity are shown in FIG. 11.

As indicated above, the trusted device may use (1110) conventional TCG procedures and protocols to obtain an Attestation Identity. The AIK certificate could be a conventional TCG AIK certificate. In alternative embodiments, however, the AIK Certificate may be a modified TCG AIK certificate, whose "security properties" field comprises a description of the platform, including its virtualisation processes that create the trust routines and operating environments. These extra fields could be part of the "security properties" field in the platform's Platform Credential, supplied to the entity creating the AIK Certificate.

In order for a virtual TPM to obtain an Attestation Identity, the server's physical TPM must have previously used an Attestation Identity of the physical of the server to sign a virtual Endorsement Credential (1120). This is consistent with, but goes beyond, the first embodiments, which require that the trusted device uses one of its private asymmetric keys to vouch for a public key belonging to a trust routine.

In such second embodiments, when a platform instantiates a trust routine, the trust routine comprises the virtual equivalent of a TCG TPM containing a TCG Endorsement Key. Since the platform fully controls the trust routine, the platform is fully capable of obtaining that Endorsement Key from the trust routine. The platform is a credible entity to construct and sign a certificate attesting that that EK belongs to a properly constructed (virtual) TPM created by the platform, this certificate functioning as an Endorsement Credential.

The certificate is thus a conventional TCG Endorsement Credential, signed by a TCG Attestation Identity belonging to the trusted device. This is possible provided the AIK credential belonging to the trusted device has fields comprising a description of the platform's security properties, including its virtualisation processes and at least part of its trust routines.

In alternative embodiments, the certificate is a modified TCG Endorsement Credential, with extra fields comprising: (1) metrics obtained by the trusted device describing the platform, including its virtualisation processes; (2) metrics obtained by the trusted device describing at least part of the trust routine. The certificate is as before signed by a TCG Attestation Identity belonging to the trusted device.

In order for a virtual TPM to obtain an Attestation Identity, the server's physical TPM must have previously used an Attestation Identity of the physical of the server to sign a virtual Platform Credential (1130). When a platform instantiates a trust routine, the trust routine comprises the virtual equivalent of a TCG TBB and TPM. The trust routine and its associated operating environment contain a TCG TPM, TBB, RTM, and CRTM securely bound to a virtual normal platform, this certificate functioning as a Platform Credential.

The platform is a credible entity to construct and sign a certificate attesting that there exists a properly constructed (virtual) TCG trusted platform containing a particular TPM.

The certificate is a conventional TCG Platform Credential, signed by a TCG Attestation Identity belonging to the trusted device. This possible provided the AIK credential belonging to the trusted device has fields comprising a description of the platform's security properties, including its virtualisation processes and at least part of its trust routines.

In alternative embodiments, this certificate is a modified TCG Platform Credential, whose extra fields comprise (1) metrics obtained by the trusted device describing the platform, including its virtualisation processes that create the trust routines and operating environments; (2) metrics obtained by the trusted device describing at least part of the trust routine. The certificate is as before signed by a TCG Attestation Identity belonging to the trusted device.

The virtual TPM of the trust routine is now equipped with the necessary credentials to obtain an Attestation Identity Certificate (1140). This is consistent with, but goes beyond, the first embodiments which indicate that a trusted party may use one of its private asymmetric keys to vouch for a public key belonging to a trust routine.

When a trust routine creates an Attestation Identity, it may wish to acquire a TCG Attestation Identity Certificate for that identity. The trust routine follows conventional TCG procedures and protocols, and supplies the Endorsement Credential and Platform Credential created by the platform.

It should be appreciated that a CA (distinguished by TCG as a "Privacy CA") can follow normal TCG procedures and protocols to create an Attestation Identity certificate for a trust routine. The certificate, however, should be a modified AIK certificate whose extra fields comprise an indication of the TCG Attestation Identity belonging to the trusted device.

Alternative embodiments are possible as the platform is itself a credible entity to construct and sign an Attestation Identity certificate for the trust routine without following TCG procedures and protocols. This is because the platform fully controls the trust routine. Such a certificate is a modified TCG Attestation identity certificate, whose extra fields comprise: (1) metrics obtained by the trusted device describing the platform, including its virtualisation processes that create the trust routines and operating environments; (2) metrics obtained by the trusted device describing at least part of the trust routine. The certificate is signed by a TCG Attestation Identity belonging to the trusted device.

When in possession of an Attestation Identity certificate, the trust routine can act as a conventional TCG TPM. In particular, when a trust routine supplies integrity metrics about an operating environment, the trust routine simply follows conventional TCG procedures and protocols, and signs the metrics using an Attestation Identity key.

In second embodiments of the invention, interactions between entities—from third parties to entities associated with the platform to users—may thus be essentially consistent with TCG procedures and protocols.

What is claimed:

1. A computer apparatus for creating a trusted environment comprising:
    a trusted device arranged to acquire a first integrity metric to allow determination as to whether the computer apparatus is operating in a trusted manner, said trusted device being a physical device which binds an identity of the computer apparatus to first reliably measured data by means of said first integrity metric, wherein the trusted device is a tamper resistant device;
    a software trust routine which binds an identity of at least an operating system environment to second reliably measured data by means of at least a second integrity metric;
    a processor arranged to allow execution of the trust routine and associated operating environment, and means for restricting access of the operating system environment to resources available to the trust routine, wherein the trust routine is arranged to acquire (i) the first integrity metric of said trusted device as an indicator of whether a user of said computer apparatus should trust that said computer apparatus and (ii) a second integrity metric to allow determination as to whether the operating system environment is operating in a trusted manner consistently with said second reliably measured data; wherein the means for restricting access of the operating environment comprises a control layer of software and an operating system of the operating system environment adapted such that any instructions in the operating system of the operating system environment with potential to affect any environment outside the operating system environment cause a transition to a control layer.

2. A computer apparatus according to claim 1, wherein the trust routine is arranged to incorporate cryptographical functionality for restricting access to data associated with the trust routine.

3. A computer apparatus according to claim 1, wherein the trusted device has an attestation identity and an attestation identity certificate containing attestation by a third party that the trusted device comprises a valid trusted platform module and that the computer apparatus comprises a valid trusted platform.

4. A computer apparatus according to claim 3, wherein the trust routine has an endorsement credential providing attestation by the trusted device that the trust routine comprises a valid virtual trusted platform module and a platform credential providing attestation by the trusted device that the trust routine and the operating environment comprises a valid virtual trusted platform.

5. A computer apparatus according to claim 4, wherein the trust routine has an attestation identity and an attestation identity certificate containing attestation that the trusted device comprises a valid trusted platform module and that the computer apparatus comprises a valid trusted platform.

6. A computer apparatus according to claim 5, wherein the attestation is provided by a third party.

7. A computer apparatus according to claim 5, wherein the attestation is provided by the trusted device.

8. A computer apparatus according to claim 5, wherein the trusted device is arranged on powering down of the computer apparatus to store the endorsement credential, the platform credential and the attestation identity certificate of the trust routine.

9. A method for creating a trusted environment in a computer apparatus, the method comprising:

acquiring a first integrity metric to allow determination as to whether a computer apparatus has a trusted device wherein the trusted device is a tamper resistant device;

binding an identity of the computer apparatus to first reliably measured data by means of said first integrity metric acquired by a trusted device in the computing apparatus, the trusted device having an attestation identity attested by a third party;

executing a trust routine and an associated operating system environment;

acquiring (i) the first integrity metric of said trusted device as an indicator of whether a user of said computer apparatus should trust that said computer apparatus and (ii) a second integrity metric to allow determination as to whether the operating system environment is operating in a trusted manner consistently with said second reliably measured data;

determining as to whether the operating system environment is operating in a trusted manner consistently with said second reliably measured data; and restricting the operating system environment's access to resources available to the trust routine by means of a control layer of software and an operating system of the operating system environment adapted such that any instruction in the operating system of the operating system environment with potential to affect any environment outside the operating system environment cause a transition to a control layer.

10. A method according to claim 9, further comprising the trust routine generating an attestation identity and obtaining an attestation identity certificate using the endorsement credential and the platform credential.

11. A method according to claim 9, further comprising:

the trusted device providing the trust routine with an endorsement credential providing attestation by the trusted device that the trust routine comprises a valid virtual trusted platform module and a platform credential providing attestation by the trusted device that the trust routine and the operating system environment comprises a valid virtual trusted platform.

* * * * *